United States Patent [19]

Feulner et al.

[11] Patent Number: 4,848,866
[45] Date of Patent: Jul. 18, 1989

[54] METHOD OF PRODUCING A DEVICE FOR COUPLING AN OPTICAL WAVEGUIDE TO AN OPTICAL COMPONENT

[75] Inventors: Alfred Feulner, Erlangen; Norbert Schmitt, Nurnberg, both of Fed. Rep. of Germany

[73] Assignee: U.S. Philips Corp., New York, N.Y.

[21] Appl. No.: 291,406

[22] Filed: Dec. 21, 1988

Related U.S. Application Data

[63] Continuation of Ser. No. 179,600, Apr. 11, 1988, abandoned.

[30] Foreign Application Priority Data

Apr. 10, 1987 [DE] Fed. Rep. of Germany ....... 3712295

[51] Int. Cl.$^4$ ............................ G02B 6/36; G02B 7/26
[52] U.S. Cl. ................................. 350/96.20; 350/96.21
[58] Field of Search ........................... 350/96.20, 96.21

[56] References Cited

U.S. PATENT DOCUMENTS 4,726,647 2/1988 Kakii et al. ..................... 350/96.21

FOREIGN PATENT DOCUMENTS 2015766 9/1979 United Kingdom .
2193603 8/1986 United Kingdom ............ 350/96.21

Primary Examiner—William L. Sikes
Assistant Examiner—Robert E. Wise
Attorney, Agent, or Firm—Ernestine C. Bartlett

[57] ABSTRACT

The invention relates to a method of producing a device for coupling an optical waveguide end section accommodated in a cylindrical plug pin to an optical component accommodated in a socket, the plug pin having a collar which limits the insertion depth. The method of producing a coupling device utilized is very simple, requires only simple means, involves a small number of production steps and ensures highly reproducible results. In the method, the optical component is fastened in the socket at a distance, which is determined by means of a first gage, from an external stop surface and, by means of a second gage, the distance of a stop sleeve stop surface facing the plug pin front face is set to a predetermined distance and the stop sleeve is fitted to the plug pin at this predetermined distance.

5 Claims, 1 Drawing Sheet

METHOD OF PRODUCING A DEVICE FOR COUPLING AN OPTICAL WAVEGUIDE TO AN OPTICAL COMPONENT

This is a continuation of application Ser. No. 179,600, filed Apr. 11, 1988, now abandoned.

FIELD OF THE INVENTION

The invention relates to a method for producing a device for coupling an optical waveguide end section accommodated in a cylindrical plug pin to an optical component accommodated in a socket, the plug pin having a collar which limits the insertion depth. Such a coupling device is disclosed in DE-OS 3121870.

BACKGROUND OF THE INVENTION

For optically connecting optical components to optical waveguides, coupling devices of a very precise construction are required. If the coupling device must be of a detachable type, so that an optical component can be coupled to different optical waveguides or an optical waveguide to different optical components, then a plug-and-socket connection is very efficient. The parts thereof must also be of a very precise structure, to ensure tht on the one hand the coupling losses can be reduced to a minimum and on the other hand no differences in the degree of coupling occur when several coupling device portions are coupled to each other. To that end it is a requirement for the distance of the optical waveguide front face from the surface of the optical component to be accurately equal to the best possible extent for all the parts of the coupling device.

SUMMARY OF THE INVENTION

The invention has for its object the provision of a method of producing a coupling device of the type described in the opening paragraph, which is as simple as possible and requires only simple means yet nevertheless ensures highly reproducible results.

This object is accomplished by a coupling device for coupling an optical waveguide end section accommodated in a cylindrical plug pin to an optical component accommodated in a socket, the plug pin having a collar which limits the insertion depth, wherein the coupling device is characterized in that the optical component is fitted at the side opposite the plug pin insertion aperture at a distance defined by a first gage, from the external stop surface of the insertion aperture and that after fastening of the optical waveguide end section in the plug pin and surface grinding of the plug pin front face, a stop sleeve having a stop surface is fitted on the plug pin as the collar, the distance of the collar stop surface facing the plug pin front face from the plug pin front face being set to a predetermined value by means of a second gage.

DETAILED DESCRIPTION OF THE PREFERRED EMBODIMENTS

Figure 1:
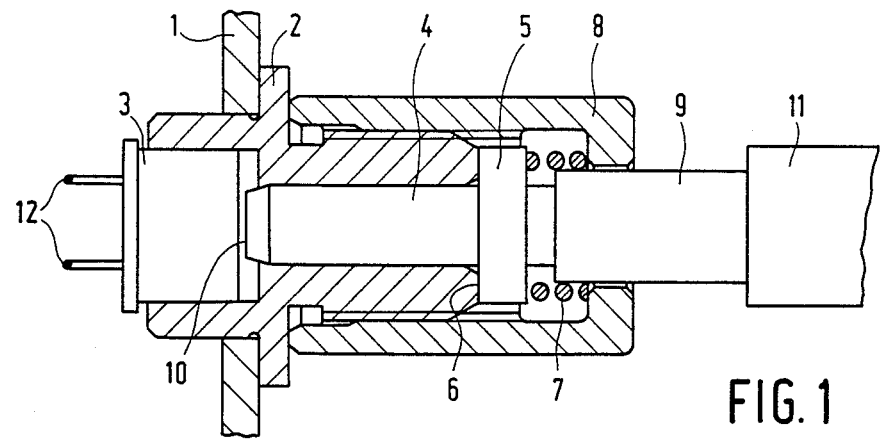
FIG. 1 shows a complete coupling device.

In the coupling device shown in FIG. 1, a socket 2 which is mounted in a wall 1 of an apparatus or in a part of an apparatus is provided at one side with an optical component 3, for example a photodiode. A cylindrical plug pin 4 which by means of one side of a collar 5 bears on the outermost stop surface 6 of the socket 2 is inserted in the other side of the socket 2. At the side the socket 2 is provided with exterior thread. By means of a threaded sleeve 8 screwed on this exterior thread, the plug pin 4 is pressed into the socket 2 via a helical spring 7, which bears aginst the other side of the collar 5. Between the surface of the photodiode 3 and the facing front face 10 of the plug pin 4 there is a defined distance which must always be accurately maintained, to provide that reproducible degrees of coupling can be achieved and also that contact of the effective surface of the photodiode with the plug pin, which might cause damage to the active surface, is prevented. An optical waveguide extends in a coaxial bore in the interior of the plug pin 4 to the front face 10 of the plug pin. A sleeve 11 which is additionally provided on the exterior envelope 9 of the optical waveguide serves as an anti-kink protection. Because of the arrangement described, the optical waveguide section which is contiguous to the front face 10 of the plug pin 4 has its axis directed concentrically to the centre of the optically effective surface are of the photodiode 3 and is perpendicular thereto. The photodiode can be connected to an electric circuit by means of the connecting pins 12.

Figure 2:
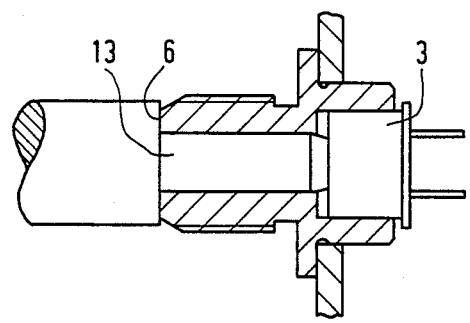
FIG. 2 shows a socket in the production stage.

During the manufacture of the coupling device, a first gage 13 is first used instead of a plug pin—as shown in FIG. 2—and the photodiode 3 is inserted from the other side, until it contacts the front face of the gage 13. Then the photodiode is fastened in this position in the socket, for example is cemented therein. In this manner a defined distance between the optically effective surface of the photodiode 3 and the exterior stop surface 6 is produced in the socket 2.

Figure 3:
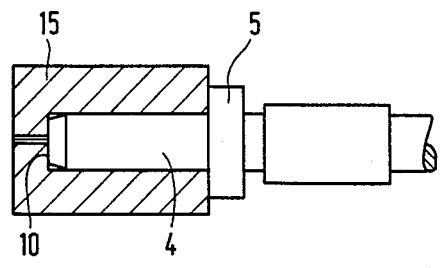
FIG. 3 shows a plug pin in the production stage.

When mounting the optical waveguide in the plug pin 4, the optical waveguide is first cemented in the coaxial bore of the plug pin. Thereafter the front face is surface-ground together with the optical waveguide, more specifically for such a long period of time as is necessary to obtain an optically perfect surface of the optical waveguide. It is not possible for a plug pin with integral collar to keep from the beginning a defined spacing between the front face of the plug pin and a stop surface of the collar, since a different quantity of material is removed from each individual plug pin during the grinding operation. As is shown in FIG. 3, a stop sleeve 5 is therefore provided on the plug pin 4 and thereafter the plug pin is inserted into a second gage 15, until the front face 10 of the plug pin 4 reaches the internal end face of the second gage. Thereafter the stop sleeve 5 is pushed against the stop surface of the second gage 15 and is fastened on the plug pin, for example, by cementing it thereto. In this manner a defined distance between the stop surface of the collar 5 and the front face 10 of the plug pin is obtained.

The method has the advantage that it can be effected rapidly and easily with simple, conventional means and that a high degree of precision of the coupling devices produced in this manner is ensured. The plug pins and the sockets are always interchangeable, without large differences in the degree of coupling occurring. The gages can be produced very accurately and, in addition, at a low cost and design effort, as machined parts.

What is claimed is:

1. A method of producing a device for coupling an optical waveguide end section accommodated in a cylindricl plug pin to an optical component accommodated in a socket, the plug pin having a collar which limits the insertion depth, characterized in that the optical component is fitted at the side opposite the plug pin insertion aperture at a distance, defined by a first gage, from the external stop surface of the insertion aperture and that after fastening of the optical waveguide end section in the plug pin and surface grinding of the plug pin front face, a stop sleeve having a stop surface is fitted on the plug pin as the collar, the distance of the collar stop surface facing the plug pin front face from the plug pin front face being set to a predetermined value by means of a second gage.

2. A method of producing a device for coupling an optical waveguide end section accommodated in a cylindrical plug pin to an optical component accommodated in a socket which comprises the steps of:

providing: (1) a socket having an exterior stop surface; (2) a cylindrical plug pin having a front face and a collar; (3) a first gage having a front face; (4) an optical component; (5) an optical waveguide having an end section; and (6) a second gage having a front face;

inserting said first gage into said socket a predetermined distance from the exterior stop surface of the socket;

inserting the optical component from the other side of the socket until it contacts the front face of the first gage;

fastening the optical component in this position in the socket whereby a defined distance between the optically effective surface of the optical component and the exterior stop surface of the socket is produced in the socket;

removing said first gage;

fastening the optical waveguide end section in the plug pin;

grinding the surface of the front face of the plug pin;

inserting the plug pin in the second gage until the front face of the plug pin reaches the front face of the second gage;

fastening the collar on the plug pin in this position whereby a defined distance between the collar and the front face of the plug pin is obtained.

3. A method as claimed in claim 2 wherein said optical component is a photodiode.

4. A method as claimed in claim 3 wherein the plug pin comprises an interior coaxial bore and the optical waveguide extends in said coaxial bore of the plug pin.

5. A method as claimed in claim 2, 3 or 4 wherein the optical waveguide section which is contiguous to the front face of the plug pin has its axis directed concentrically to the center of the optically effective area of the optical component and is perpendicular thereto.

* * * * *